(12) United States Patent
Takata

(10) Patent No.: US 9,209,705 B2
(45) Date of Patent: Dec. 8, 2015

(54) POWER SUPPLY CIRCUIT AND HEAT PUMP UNIT

(75) Inventor: Nobuyoshi Takata, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 256 days.

(21) Appl. No.: 14/001,179

(22) PCT Filed: Dec. 19, 2011

(86) PCT No.: PCT/JP2011/079309
§ 371 (c)(1),
(2), (4) Date: Aug. 23, 2013

(87) PCT Pub. No.: WO2012/114626
PCT Pub. Date: Aug. 30, 2012

(65) Prior Publication Data
US 2013/0333861 A1 Dec. 19, 2013

(30) Foreign Application Priority Data
Feb. 25, 2011 (JP) .................................. 2011-039962

(51) Int. Cl.
*H02M 7/06* (2006.01)
*H02J 1/10* (2006.01)
*H02M 7/08* (2006.01)

(52) U.S. Cl.
CPC .................. *H02M 7/06* (2013.01); *H02J 1/108* (2013.01); *H02M 7/08* (2013.01); *H02M 7/064* (2013.01)

(58) Field of Classification Search
CPC ....... H02M 7/06; H02M 7/062; H02M 7/064; H02M 7/066; H02M 7/08; H02M 7/15; H02M 7/17; H02J 1/108; H02J 3/14
USPC ................. 363/81, 125, 126; 307/38; 165/61; 700/297–300
See application file for complete search history.

(56) References Cited

U.S. PATENT DOCUMENTS 4,499,533 A * 2/1985 Okamoto ....................... 363/126
5,896,284 A * 4/1999 Murasato et al. ............. 363/124
7,633,249 B2 12/2009 Sekimoto et al.
(Continued)

FOREIGN PATENT DOCUMENTS

JP 63-58899 U 4/1988
JP 6-245541 A 9/1994
(Continued)

OTHER PUBLICATIONS

Fukue et al., "The Development of A-Single-to-Tree-Phase-Matrix-Converter for Sensorless DCBL motor drive of 1piston rotary compressor," 2008 IEEJ Industry Applications Society Conference, 2008, vol. 1, pp. 469-477.
(Continued)

*Primary Examiner* — Jessica Han
(74) *Attorney, Agent, or Firm* — Birch, Stewart, Kolasch & Birch, LLP

(57) ABSTRACT

A first conversion section converts, into a first direct-current voltage, an alternating-current voltage input from input lines, and applies the same between power supply lines. A diode is arranged between the power supply lines such that an anode thereof faces toward the power supply line side. A capacitor has both ends connected to a direct-current load, and is connected in series with the diode. A switch section selects conduction/non-conduction between an alternating-current power supply and the first conversion section. A second conversion section converts, into a second direct-current voltage, the alternating-current voltage input without passing through the switch section, and is connected to a connection point located between the capacitor and the diode to apply the second direct-current voltage to the capacitor.

12 Claims, 8 Drawing Sheets

(56) References Cited

U.S. PATENT DOCUMENTS

| | | |
|---|---|---|
| 2008/0161973 A1 | 7/2008 | Sakae et al. |
| 2011/0046791 A1 | 2/2011 | Sakae et al. |
| 2013/0128641 A1* | 5/2013 | Higashihama et al. ....... 363/126 |
| 2015/0043257 A1* | 2/2015 | Nam .............................. 363/53 |

FOREIGN PATENT DOCUMENTS

| | | |
|---|---|---|
| JP | 7-059359 A | 3/1995 |
| JP | 2000-217247 A | 8/2000 |
| JP | 2005-020836 A | 1/2005 |
| JP | 3772898 B2 | 5/2006 |
| JP | 2006-153346 A | 6/2006 |
| JP | 3806882 B2 | 8/2006 |
| JP | 2008-069992 A | 3/2008 |

OTHER PUBLICATIONS

International Search Report issued in PCT/JP2011/079309, mailed on Feb. 7, 2012.

* cited by examiner

POWER SUPPLY CIRCUIT AND HEAT PUMP UNIT

TECHNICAL FIELD

The present invention relates to a power supply circuit and a heat pump unit.

BACKGROUND ART

Japanese Patent Application Laid-Open No. 2008-69992 describes a first diode bridge, a first capacitor, a second diode bridge, and a second capacitor in a heat pump device. The first diode bridge rectifies an alternating-current voltage into a direct-current voltage to apply the same to the first capacitor. The first capacitor supplies operating power to a compressor. The second diode bridge rectifies an alternating-current voltage into a direct-current voltage to apply the same to the second capacitor. The second capacitor supplies operating power to a controller.

Switching means is provided between the first diode bridge and an alternating-current power supply. This switching means becomes non-conductive, so that the supply of operating power to the compressor can be interrupted.

The second diode bridge is connected to the alternating-current power supply on the alternating-current power supply side with respect to the switching means. Accordingly, operating power is supplied to the controller regardless of the conduction/non-conduction of the switching means. In other words, the supply of an operating voltage to the compressor is interrupted regardless of the supply of the operating power to the controller.

Consequently, while the supply of operating power to the compressor is interrupted, and power consumption in a standby state reduces, operating power is supplied to the controller, and hence the condition of the heat pump can be confirmed.

Technologies related to the present invention are described in Japanese Patent Application Laid-Open No. 2000-217247, Japanese Patent No. 3806882, Japanese Patent No. 3772898 and Takashi Fukue, other two persons, "Development of A-Single-to-Three-Phase-Matrix-Converter for the Sensorless DCBL Motor Drive of a 1 Piston Rotary Compressor", 2008 IEEJ Industry Applications Society Conference, 2008, Vol. 1, pp. 469-470.

PRIOR ART DOCUMENTS

Patent Documents

SUMMARY OF THE INVENTION

Problems to be Solved by the Invention

In the device which drives the compressor in Japanese Patent Application Laid-Open No. 2008-69992, there is a case where a series connection body configured by a diode and a third capacitor is connected in parallel to the first capacitor. The diode is provided such that an anode thereof faces toward a high potential side. Such a diode and such a third capacitor have a function as a CD snubber. In an inductive load such as a compressor, a regenerative current flows to the power supply (first capacitor) side. The diode and the third capacitor can absorb such a regenerative current along with the first capacitor. In such a configuration, the smaller the electrostatic capacitance of the first capacitor is, the greater the importance of existence of the third capacitor is. This is because the smaller the electrostatic capacitance of the first capacitor is, the more the voltage of the first capacitor is likely to rise by the regenerative current, and the third capacitor can suppress such voltage rise.

However, in such a configuration, three capacitors, i.e., the first and third capacitors, and the second capacitor for the controller serving as a direct-current load are provided.

An object of the present invention is to provide a power supply circuit that can interrupt the supply of an operating voltage to an inductive load regardless of the supply of the operating voltage to the direct-current load, and can be manufactured at a lower cost.

Means for Solving the Problems

A first aspect of a power supply circuit according to the present invention includes first and second power supply lines (LH1, LL1) that are connected to an inductive load (21); an input line (L1, L2) that is connected to an alternating-current power supply (E1); a first conversion section (11) that converts, into a first direct-current voltage, an alternating-current voltage input from the input line, and applies the first direct-current voltage between the first power supply line, which is employed as a positive pole, and the second power supply line; a diode (D1) that has a cathode and an anode, and is arranged between the first and the second power supply lines such that the anode faces toward the first power supply line side; and a capacitor (C1) that has both ends connected to a direct-current load (22), and is connected in series with the diode between the first and the second power supply lines; a switch section (S1) that is provided on the input line, and selects conduction/non-conduction between the alternating-current power supply and the first conversion section; and a second conversion section (12) that converts, into a second direct-current voltage, the alternating-current voltage input without passing through the switch section, and is connected to a connection point (P1) located between the capacitor and the diode to apply the second direct-current voltage to the capacitor.

A second aspect of the power supply circuit according to the present invention, which is the power supply circuit according to the first aspect, further includes a resistor (R1) that is arranged on a side opposite to the capacitor (C1) with respect to the connection point (P1), and is connected in series with the diode (D1) and the capacitor.

A third aspect of the power supply circuit according to the present invention, which is the power supply circuit according to the first aspect, further includes a resistor (R2) that is arranged on a side of the capacitor (C1) with respect to the connection point (P1), and is connected in series with the diode (D1) and the capacitor.

In a fourth aspect of the power supply circuit according to the present invention, which is the power supply circuit according to any one of the first to third aspects, the direct-current load (22) is a controller that controls the inductive load (21), and the second conversion section (12) is a diode half-wave rectifier circuit.

A fifth aspect of the power supply circuit according to the present invention, which is the power supply circuit according to any one of the first to fourth aspects, further includes a second input line (L3) that is connected to the alternating-current power supply; and a second switch section (S2) that selects between a first state where the second conversion section (12) is connected to the input line (L1), and a second state where the second conversion section is connected to the second input line.

A sixth aspect of the power supply circuit according to the present invention, which is the power supply circuit according to any one of the first to fifth aspects, further includes a second input line (L3) that is connected to the alternating-current power supply; and a third switch section (S3) that is controlled by a predetermined controller (42) and provided on the second input line (L3).

A first aspect of a heat pump unit according to the present invention, which is a heat pump unit including the power supply circuit according to the sixth aspect, includes a first device (100) that has a heat exchanger which changes heat with an object to be temperature-controlled; a second device (200) that functions as a heat source of the first device; wherein one of the first device and the second device includes the third switch section (S3) and the predetermined controller (42), and the other of the first device and the second device includes the power supply circuit according to the first aspect, and the second switch section.

Effects of the Invention

According to the first aspect of the power supply circuit according to the present invention, the first direct-current voltage applied to the first and second power supply lines functions as the operating voltage of the inductive load. The capacitor absorbs a regenerative current from the inductive load. Moreover, the voltages of the both ends of the capacitor function as the operating voltage of the direct-current load.

Accordingly, the capacitor exerts both a function of absorbing the regenerative current and a function of smoothing the second direct-current voltage. Therefore, manufacturing cost is reduced compared to a case of providing two capacitors that exert the respective these functions.

Moreover, the supply of the operating voltage to the inductive load is interrupted by the interruption of the switch section. This is because the switch section interrupts the supply of the operating voltage to the inductive load from the first conversion section, and the diode prevents the second direct-current voltage from being applied to the inductive load. On the other hand, regardless of the operation of the switch section, the second direct-current voltage is supplied to the direct-current load as the operating voltage. That is, regardless of the supply of the operating power to the direct-current load, the supply and the interruption of the operating voltage to the inductive load are controlled.

According to the second aspect of the power supply circuit according to the present invention, the resistor consumes a regenerative current. Moreover, the resistor is arranged on a side opposite to the capacitor with respect to the connection end, and hence the second direct-current voltage given to the direct-current load is not lowered.

According to the third aspect of the power supply circuit according to the present invention, the resistor consumes the regenerative current. Moreover, in a case where the capacitor is charged from the second conversion section, the register functions as a current-limiting resistor, and can suppress an inrush current to the capacitor.

According to the fourth aspect of the power supply circuit according to the present invention, the capacitor has a function of smoothing the second direct-current voltage, and hence a half-wave rectifier circuit can be employed as the second conversion section, and manufacturing cost can be reduced.

According to the fifth aspect of the power supply circuit according to the present invention, the second state is selected, so that an operating voltage can be supplied to the direct-current load through the second input line.

According to the sixth aspect of the power supply circuit according to the present invention, when the third switch section is interrupted, the supply of the second direct-current voltage to the direct-current load can be interrupted. On the other hand, the supply of the first direct-current voltage to the inductive load can be interrupted by the interruption of the first switch section. Consequently, the power supply to both of the inductive load and the direct-current load is interrupted, so that a stand-by state can be implemented. Moreover, when a predetermined controller causes the third switch section to become conductive in this state, power can be supplied to the direct-current load through the second input line, thereby enabling return from the stand-by.

According to the first aspect of the heat pump unit according to the present invention, the power supply from one of the first device and the second device to the other of the devices is interrupted, thereby enabling stand-by, and the stand-by state of the other of the devices can be returned by the one of the devices.

These and other objects, features, aspects and advantages of the present invention will become more apparent from the following detailed description of the present invention when taken in conjunction with the accompanying drawings.

EMBODIMENT FOR CARRYING OUT THE INVENTION

First Embodiment

Figure 1:
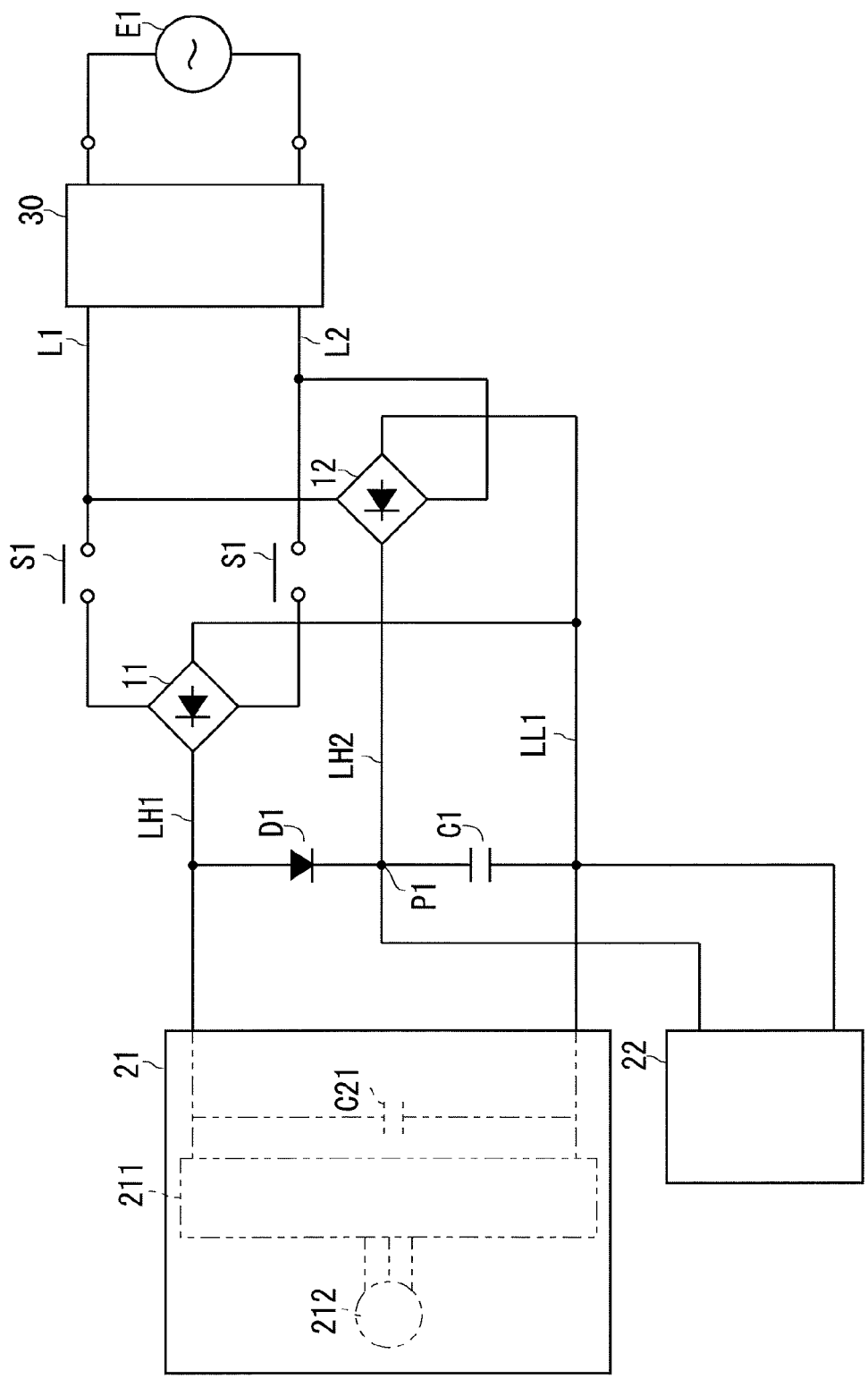
FIG. 1 is a diagram showing an example of a conceptual configuration of a power supply circuit.

As illustrated in FIG. 1, this power supply circuit includes a first conversion section 11 and a second conversion section 12. An alternating-current voltage is input to the first conversion section 11 from an alternating-current power supply E1 through input lines L1, L2. Although a single-phase alternating-current voltage is input to the first conversion section 11 in the illustration of FIG. 1, however a multi-phase alternating-current voltage may be input to the first conversion section 11. The first conversion section 11 converts the input alternating-current voltage into a direct-current voltage to apply the same to power supply lines LH1, LL1. In the illustration of FIG. 1, the direct-current voltage is applied such that the power supply lines LH1, LL1 become a positive pole and a negative pole, respectively. In other words, the potential applied to the power supply line LH1 is higher than the potential applied to the power supply line LL1.

The first conversion section 11 is a diode full-wave rectifier circuit in the illustration of FIG. 1, but is not limited to this. The first conversion section 11 may be any AC/DC converter having any rectifier circuit or switching element.

A switch section S1 is provided on at least one of the input lines L1, L2. The switch section S1 selects conduction/non-conduction between the alternating-current power supply E1 and the first conversion section 11. In the illustration of FIG. 1, the two switch sections S1 are provided on the input lines L1, L2, respectively.

A diode D1 and a capacitor C1 are provided between the power supply lines LH1, LL1. The anode of the diode D1 is provided to face toward the power supply line LH1 side. The capacitor C1 is connected in series with the diode D1 between the power supply lines LH1, LL1. The diode D1 is arranged on the power supply line LH1 side with respect to the capacitor C1 in the illustration of FIG. 1, but is not limited to this, and may be arranged on the power supply line LL1 side with respect to the capacitor C1.

A compressor driving section 21 that is an example of an inductive load is connected to the power supply lines LH1, LL1. The compressor driving section 21 has, for example, an inverter 211, and a motor 212 that drives a compression mechanism. The compressor driving section 21 uses the direct-current voltage output from the first conversion section 11 as an operating power.

The diode D1 blocks a current that flows from the capacitor C1 to the compressor driving section 21. On the other hand, the diode D1 and the capacitor C1 can absorb a regenerative current from the compressor driving section 21. For example, when the motor 212 is stopped, counter electromotive force is generated in the motor 212, thereby resulting in a regenerative current flowing from the compressor driving section 21 to the power supply line LH1. The diode D1 and the capacitor C1 function as a so-called CD snubber circuit, and absorb this regenerative current. Consequently, it is possible to suppress rise of the direct-current voltage between the power supply lines LH1, LL1 due to counter electromotive force of the motor 212. That is, it is possible to suppress overvoltage generated in the compressor driving section 21 (for more detail, the inverter 211, in a case where the inverter 211 is included in the input stage of the compressor driving section 21, for example).

The compressor driving section 21 may have, for example, a capacitor C21 provided between the power supply lines LH1, LL1. The larger the electrostatic capacitance of this capacitor C21 is, the more the function of smoothing the direct-current voltage between the power supply lines LH1, LL1 improves. When the capacitor C21 has sufficiently-large electrostatic capacitance, the capacitor C21 functions as a so-called smoothing capacitor.

On the other hand, the electrostatic capacitance of the capacitor C21 may be small, for example, several dozen μF or less. In this case, the direct-current voltage between the power supply lines LH1, LL1 largely pulsates at a frequency which is twice the frequency of the alternating-current voltage from the alternating-current power supply E1. However, even in such a case, the inverter 211 is suitably controlled according to the pulsation of this direct-current voltage, thereby giving the motor 212 a suitable alternating-current voltage, and also enabling reduction in the harmonic content of the alternating current flowing through the input lines L1, L2. Such an inverter control technology is referred to as a so-called capacitorless inverter control.

Such a capacitor C21 having small electrostatic capacitance cannot sufficiently absorb the regenerative current from the motor 212. Accordingly, the voltages of the power supply lines LH1, LL1 rise. However, according to this power supply circuit, the capacitor C1 suppresses such voltage rise. On the other hand, even when the compressor driving section 21 has the capacitor C21 whose electrostatic capacitance is large, the capacitor C1 can further reduce the rise in the voltages of the power supply lines LH1, LL1.

A controller 22 which is an example of a direct-current load is connected to the both ends of the capacitor C1. In the illustration of FIG. 1, the capacitor C1 is connected to the power supply line LL1, and therefore the controller 22 is connected to a connection point P1 between the diode D1 and the capacitor C1, and the power supply line LL1. The controller 22 uses the direct-current voltage charged in the capacitor C1 as operating power. That is, the capacitor C1 has a function of supplying the direct-current voltage applied to the controller 22.

The controller 22 may control the compressor driving section 21. For example, in a case where the compressor driving section 21 has an inverter, a switching signal is output to the inverter. Furthermore, the controller 22 may control the conduction/non-conduction of the switch section S1.

Herein, the controller 22 may include a microcomputer and a storage device. The microcomputer executes each of processing steps (i.e., processes) written in a program. The above storage device can be configured by one of or a plurality of various storage devices such as a ROM (Read Only Memory), a RAM (Random Access Memory), a rewritable nonvolatile memory (EPROM (Erasable Programmable ROM), etc.), and a hard disk drive. The storage device stores various information, data, and the like, stores a program executed by the microcomputer, and provides a working area for executing the program. The microcomputer can grasp so as to function as the various means corresponding to the respective processing steps written in the program, or can grasp so as to implement various functions corresponding to the respective processing steps. The controller 22 is not limited to this, and various processes executed or various means implemented by the controller 22, or a part of or all of various functions may be implemented with hardware.

The second conversion section 12 converts, into a direct-current voltage, an alternating-current voltage that is input without passing through the switch section S1. In the illustration of FIG. 1, the second conversion section 12 is connected to the input lines L1, L2 on the alternating-current power supply E1 side with respect to the switch section S1. Consequently, the alternating-current voltage is input to the second conversion section 12 from the input lines L1, L2 without passing through the switch section S1. The second conversion section 12 is connected to the connection point P1 between the capacitor C1 and the diode D1 to apply the converted direct-current voltage to the capacitor C1.

The second conversion section 12 is a diode full-wave rectifier circuit in the illustration of FIG. 1, but is not limited to this, and may be any AC/DC converter having any rectifier circuit or switching element.

In the illustration of FIG. 1, a filter 30 is provided. The filter 30 is provided between the alternating-current power supply E1 and the second conversion section 12. The filter 30 reduces the harmonic content of the alternating current flowing through the input lines L1, L2.

In the power supply circuit, the capacitor C1 has the function of absorbing the regenerative current from the compressor driving section 21, and the function of supplying the direct-current voltage applied to the controller 22, as described above. Therefore, it is possible to reduce manufacturing cost compared to a case of providing two capacitors having respective these functions.

Additionally, in such a power supply circuit, in a case where it is desired to interrupt power supply to the compressor driving section 21, for example, in a case where abnormality occurs in the compressor, or in a case where the compressor is not required to be driven, the switch section S1 is interrupted. Such interruption may be performed, for example, by the controller 22, or the switch section S1 may be interrupted with detection of the abnormality of the compressor or the like by a predetermined abnormal detector as a trigger. Consequently, it is possible to interrupt the supply of the operating voltage to the compressor driving section 21. This is because the supply of the direct-current voltage from the first conversion section 11 is interrupted by the interruption of the switch section S1, and furthermore, the direct-current voltage from the second conversion section 12 is not supplied to the compressor driving section 21 by the diode D1.

On the other hand, according to this power supply circuit, it is possible to supply the operating power to the controller 22 regardless of the interruption of the switch section S1. This is because the power supply from the second conversion section 12 to the capacitor C1 is not interrupted, and the direct-current voltage charged in the capacitor C1 is supplied to the controller 22.

Thus, it is possible to maintain the power supply to the controller 22, and hence there is advantage particularly, for example, for the following case.

There is a case where the controller 22 stores the abnormality of the compressor or the like in a predetermined recording medium. Such abnormality of the compressor or the like is detected, for example, by a predetermined sensor, and the detected results are output to the controller 22, and the controller 22 records these on the recording medium. In such a case, even when the controller 22 or a predetermined abnormality detection section interrupts the switch section S1 with the occurrence of the abnormality of the compressor or the like as a trigger, the operating power is supplied to the controller 22, and hence it is possible to confirm the abnormality. Such confirmation may be performed, for example, by providing a display section, and displaying the abnormality on the display section with the controller 22. Consequently, search as to the abnormality can be facilitated.

When the controller 22 externally receives input indicating that the drive of the compressor is unnecessary, or when the controller 22 determines that the drive of the compressor is unnecessary, the controller 22 cause the switch section S1 to become non-conductive, so that the power supply to the compressor driving section 21 can be interrupted. Consequently, it is possible to cause the compressor driving section 21 to stand by, and furthermore it is possible to reduce power consumption. Moreover, the operating power is supplied to the controller 22 at this time, and hence the controller 22 causes the switch section S1 to become conductive again, and the operating power can be supplied to the compressor driving section 21.

In the illustration of FIG. 1, the second conversion section 12 is connected to the input lines L1, L2, and supplied with the alternating-current voltage from the alternating-current power supply E1. However, it is not limited to this, and the alternating-current voltage may input to the second conversion section 12 from another alternating-current power supply through input lines other than the input lines L1, L2. Alternatively, for example, the alternating-current voltage is applied to a primary winding, and two alternating-current voltages generated in two secondary windings magnetically connected to the primary winding may be input to the first conversion section 11 and the second conversion section 12, respectively. In the present application, these connection aspects are collectively called "the alternating-current voltage is input to the second conversion section 12".

Figure 2:
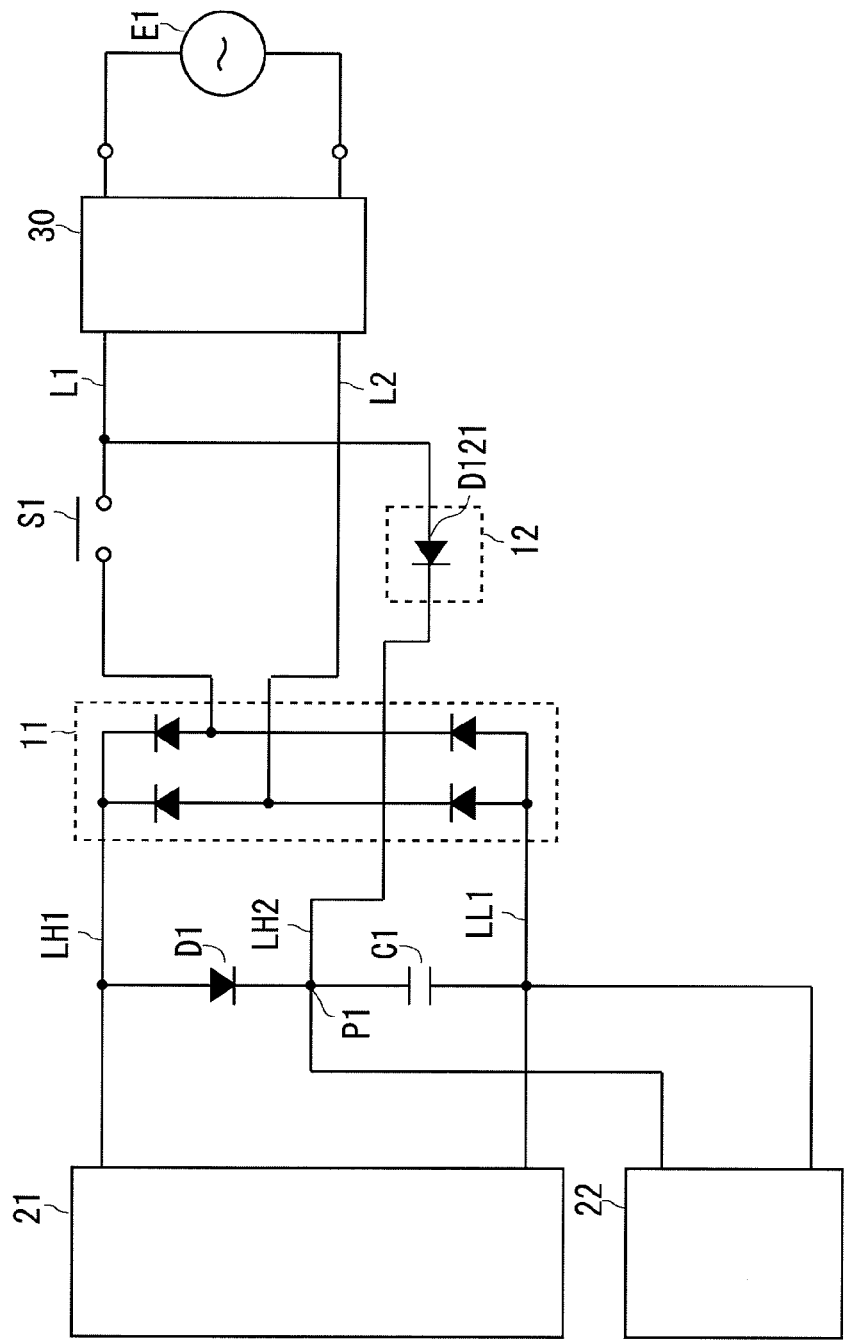
FIG. 2 is a diagram showing an example of a conceptual configuration of a power supply circuit.

FIG. 2 shows an example of a conceptual configuration of a power supply circuit. The power supply circuit illustrated in FIG. 2 is different from the power supply circuit illustrated in FIG. 1, in a switch section S1 and a second conversion section 12. The second conversion section 12 includes a diode D121. The diode D121 is provided between an input line L1 and a connection point P1. The diode D121 is provided such that the anode thereof faces toward the input line L1 side. The switch section S1 is provided on the input line L1, and is not provided on an input line L2.

According to such a power supply circuit, in a case where the switch section S1 is caused to become non-conductive, a current flows from the input line L1 to the input line L2 through the diode D121, a capacitor C1, and a diode belonging to a first conversion section 11 and provided between a power supply line LL1 and the input line L2. That is, the second conversion section 12 half-rectifies an alternating-current voltage to charge the capacitor C1. Therefore, the switch section S1 can supply operating power to a controller 22 even after non-conduction.

When the switch section S1 is non-conductive, the compressor driving section 21 does not need to be driven. Accordingly, the power consumption of the controller 22 at this time is smaller than that when the switch section S1 is conductive. Therefore, in a case where the switch section S1 is non-conductive, sufficient electric power can be supplied even by half-wave rectification. Alternatively, the operating voltage of the controller 22 is lower than that of the compressor driving section 21, and the power consumption of the controller 22 is also smaller than that of the compressor driving section 21, and hence sufficient operating power can be supplied even by half-wave rectification. Alternatively, a direct-current voltage from the second conversion section 12 is smoothed by the capacitor C1. Accordingly, the capacitor C1 can reduce the variation of the direct-current voltage even by half-wave rectification, and the half-wave rectification may be employed. When a half-wave rectifier circuit is employed as the second conversion section 12, manufacturing cost can be reduced compared to a case where a full-wave rectifier circuit is employed as the second conversion section 12.

In the illustration of FIG. 2, the switch section S1 may be provided on only the input line L2. In this case, the diode D121 is provided between a connection point on an alternating-current power supply E1 side with respect to the switch section S1 of the input line L2, and a connection point P1. This is because a current is not supplied to the capacitor C1 by the non-conduction of the switch section S1, when the diode D121 is provided between the connection point P and the input line L1.

Figure 3:
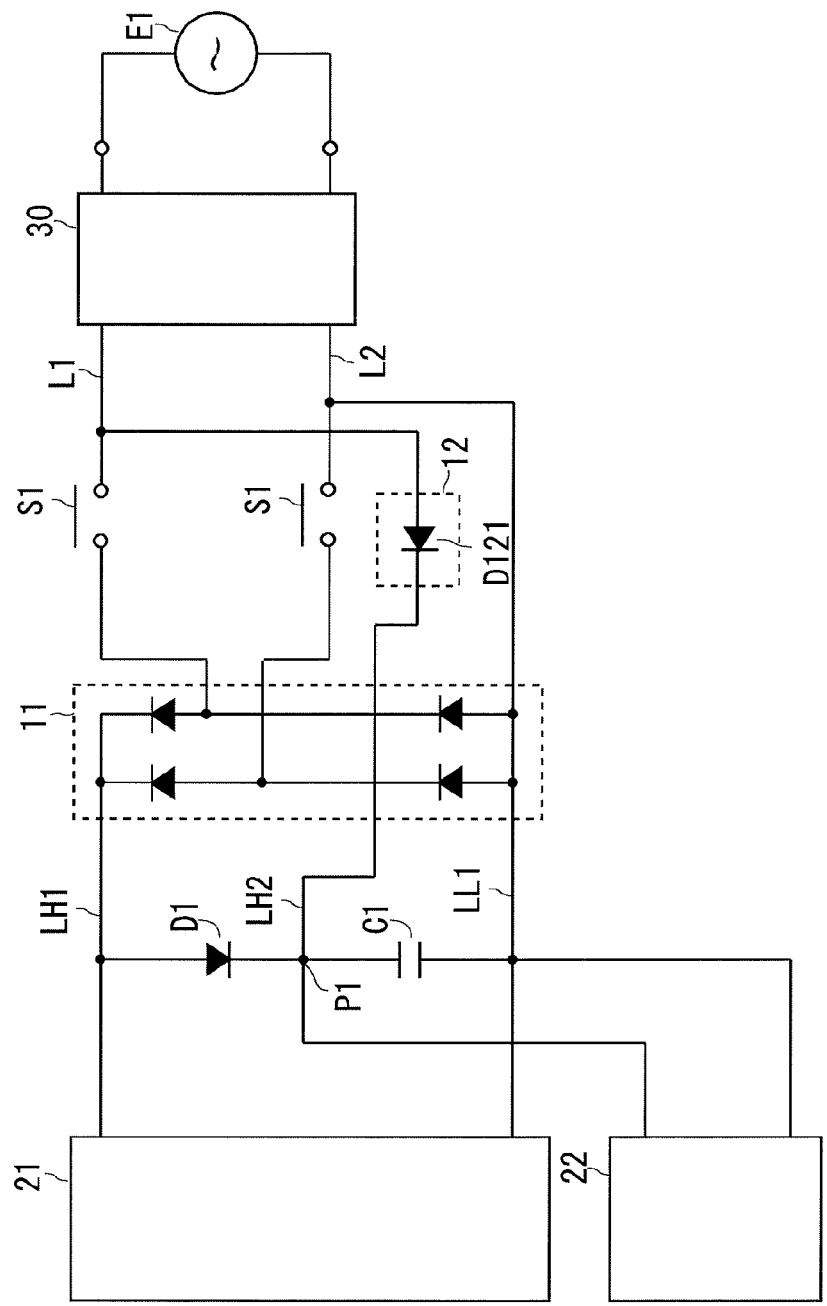
FIG. 3 is a diagram showing an example of a conceptual configuration of a power supply circuit.

Alternatively, respective switch sections S1 may be provided on the input lines L1, L2. In this case, as illustrated in FIG. 3, the input line L2 and the power supply line LL1 are connected to each other on the alternating-current power supply E1 side with respect to the switch section S1 provided on the input line L2. According to such a power supply circuit, when the switch section S1 is non-conductive, a current flows from the input line L1 to the input line L2 through the diode D121 and the capacitor C1. Therefore, even after the switch section S1 is become non-conductive, an operating voltage can be supplied to the controller 22. Also in the illustration in FIG. 2, the input line L2 and the power supply line LL1 may be connected to each other.

In place of the diode D121, a diode may be provided on the power supply line LL1 on the input line L2 side with respect to the first conversion section 11. At this time, the diode is provided such that the anode thereof faces toward the capacitor C1 side. Alternatively, both of this diode and the diode D121 may be provided.

Second Embodiment

Figure 4:
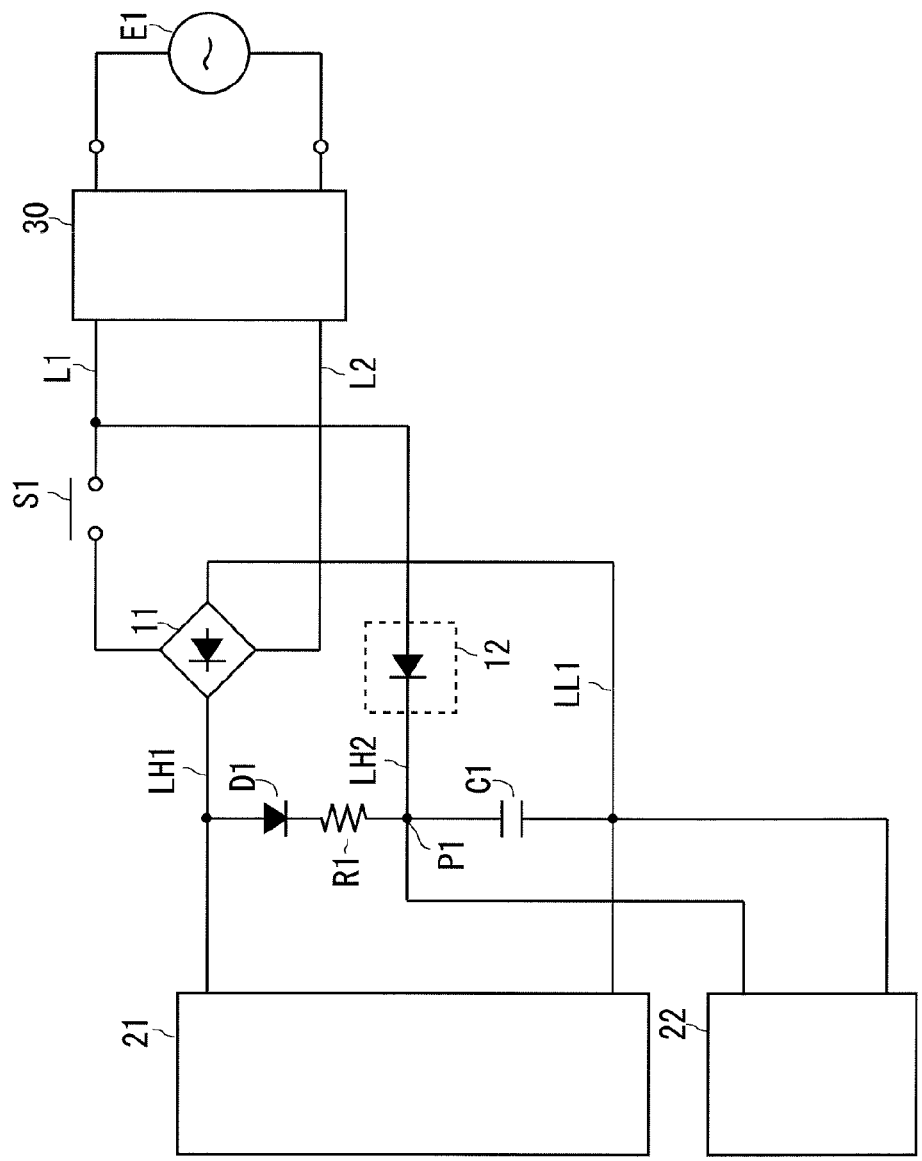
FIG. 4 is a diagram showing an example of a conceptual configuration of a power supply circuit.

Herein, the difference between a power supply circuit according to a second embodiment and the power supply circuit according to the first embodiment will be described. As illustrated in FIG. 4, this power supply circuit further includes a resistor R1 compared to the power supply circuit described in the first embodiment. The power supply circuit in FIG. 4 has a configuration in which the resistor R1 is added to the power supply circuit in FIG. 2, but is not limited to this, and may have a configuration in which the resistor R1 is added to the power supply circuit in FIG. 1 or FIG. 3.

The resistor R1 is connected in series with a diode D1 and a capacitor C1 between power supply lines LH1, LL1. Consequently, the resistor R1 can consume a part of a regenerative current of a compressor driving section 21. Accordingly, the voltage rise of the capacitor C1 can be suppressed. In other words, the capacitor C1 whose electrostatic capacitance is much smaller can be employed.

Furthermore, in the illustration of FIG. 4, the resistor R1 is located on a side opposite to the capacitor C1 with respect to a connection point P1. Accordingly, the resistor R1 does not affect a direct-current voltage applied from the capacitor C1 to a controller 22. That is, the direct-current voltage charged in the capacitor C1 can be applied to the controller 22 without voltage drop resulting from the resistor R1, or without power consumption by the resistor R1.

Figure 5:
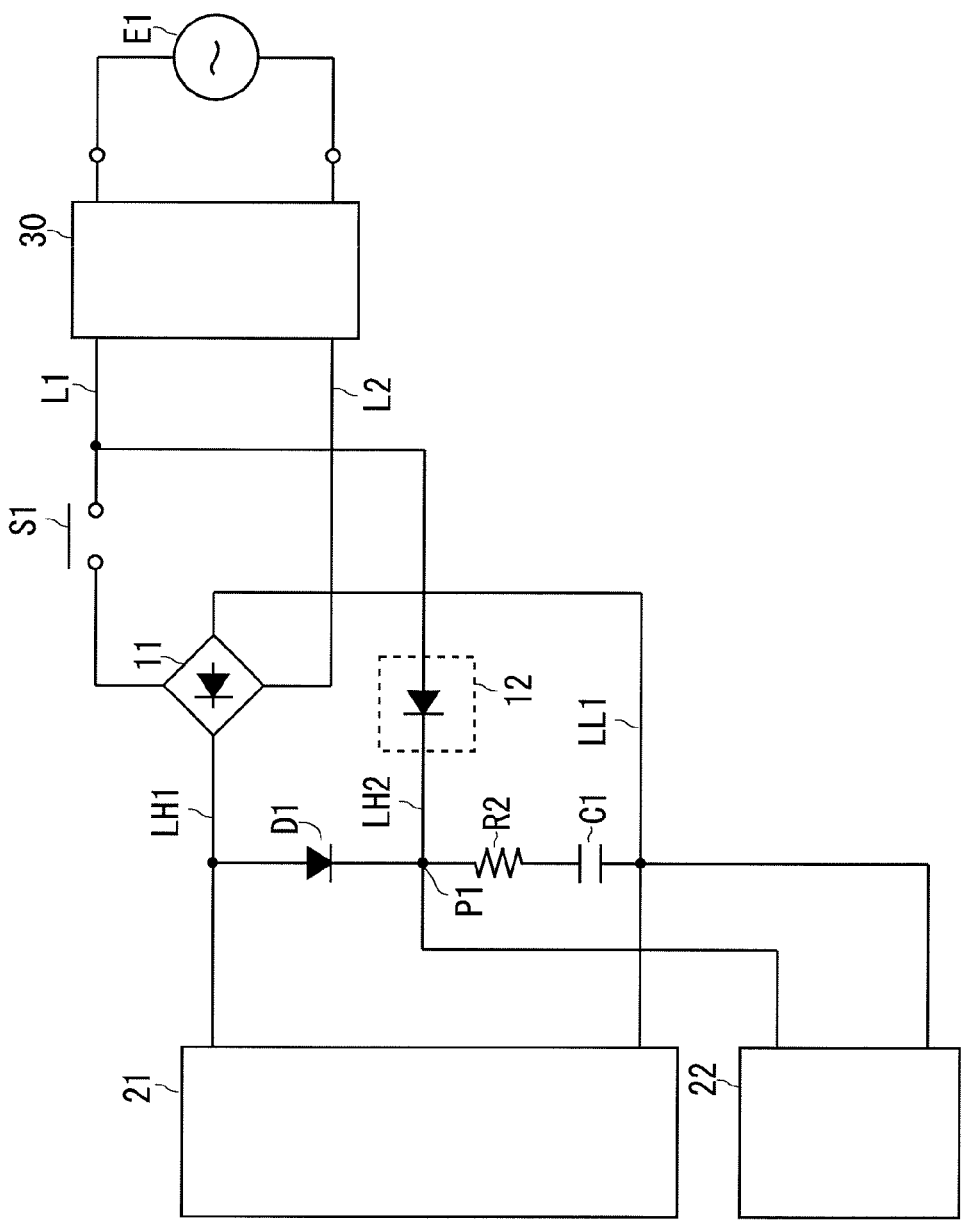
FIG. 5 is a diagram showing an example of a conceptual configuration of a power supply circuit.

A power supply circuit illustrated in FIG. 5 includes a resistor R2 in place of the resistor R1, compared to the power supply circuit in FIG. 4. The resistor R2 is connected in series with a diode D1 and a capacitor C1 between power supply lines LH1, LL1. Consequently, the resistor R2 can consume a part of a regenerative current, similarly to the resistor R1. Moreover, the resistor R2 is arranged on the capacitor C1 side with respect to a connection point P1. This brings the following effects. Herein, a case of connecting an alternating-current power supply E1 when a voltage is not changed in the capacitor C1 is conceived. At this time, a current flows from a second conversion section 12 to the capacitor C1, and the resistor R2 is interposed on the current path. Therefore, the resistor R2 functions as a so-called current-limiting resistor, and can suppress increase in the current flowing to the capacitor C1 (so-called inrush current).

Third Embodiment

Figure 6:
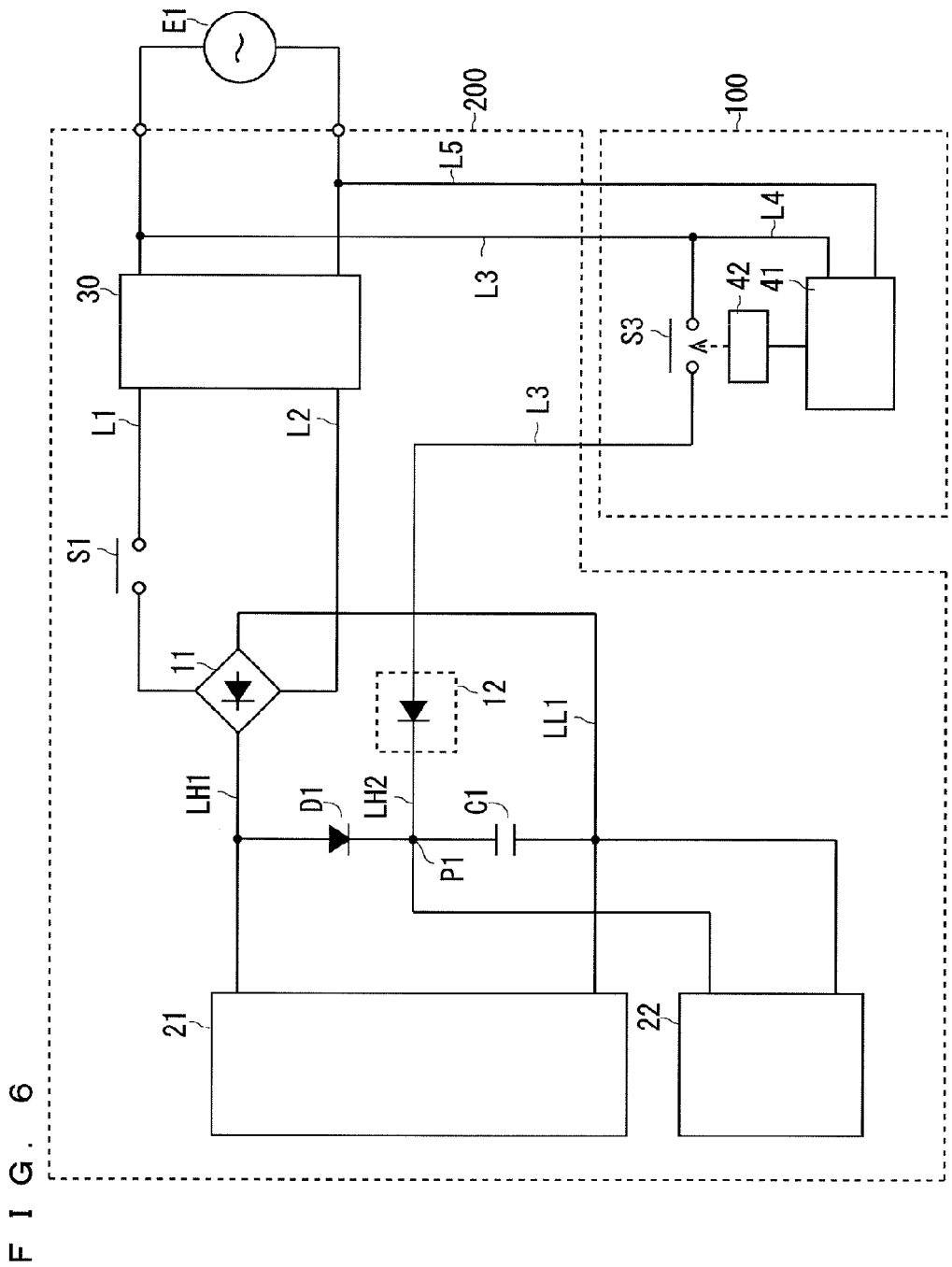
FIG. 6 is a diagram showing an example of a conceptual configuration of a power supply circuit.

As illustrated in FIG. 6, this power supply circuit further includes a switch section S3 compared to the power supply circuit described in the first embodiment. In the power supply circuit, at least one of resistors R1, R2 may be provided similarly to the second embodiment.

The switch section S3 is provided between an input line L1 and a second conversion section 12. For more detail, the switch section S3 is provided on an input line L3 branched from the input line L1 on an alternating-current power supply E1 side with respect to a switch section S1 and connected to second conversion section 12. In the illustration of FIG. 6, the second conversion section 12 illustrated in FIG. 2 is employed.

The conduction/non-conduction of the switch section S3 is controlled, for example, by a controller 42. Operating power is supplied to the controller 42 from a power supply circuit 41. The power supply circuit 41 is connected to an input line L4 branched from the input line L3 on the alternating-current power supply E1 side with respect to the switch section S3, and an input line L5 branched from an input line L2. The power supply circuit 41 converts alternating-current voltages input from the input line L4, L5, for example, into suitable direct-current voltages to give the same to the controller 42.

When the controller 42 causes the switch section S3 to become non-conductive in a state where the switch section S1 is in a non-conductive state, it is possible to interrupt the supply of operating power to the controller 22. Therefore, it is possible to interrupt the power supply not only to the compressor driving section 21, but also to the controller 22 to implement a stand-by state. Consequently, power consumption in the stand-by state can be further reduced.

In a case where the controller 42 controls the switch sections S1, S3, the controller 42 causes the switch sections S1, S3 to become non-conductive, thereby enabling implementation of the stand-by state. Alternatively, in a case where the controller 22 controls the switch section S1, the controllers 22, 42 are configured so as to be capable of transmitting/receiving signals to/from each other. Then, the controller 22 causes the switch section S1 to become non-conductive, and thereafter transmits this information to the controller 42, and the controller 42 causes the switch section S3 to become non-conductive.

In the illustration of FIG. 6, the switch section S3, the controller 42, and the power supply circuit 41 are provided in a device 100, and other components are provided in a device 200. In this case, control from the device 100 causes the device 200 to stand by. Unlikely the illustration of FIG. 6, these components may be provided in a single device.

Figure 7:
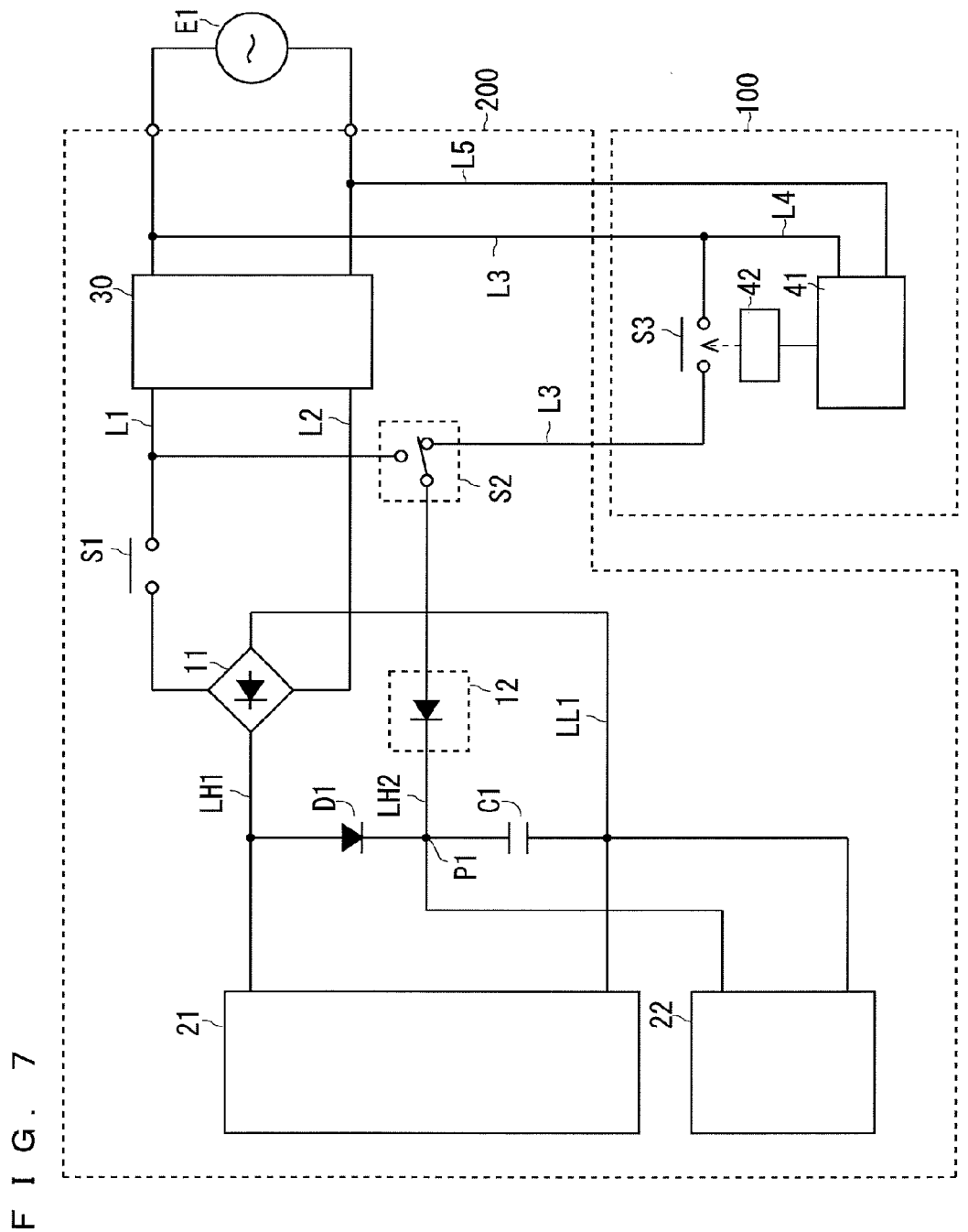
FIG. 7 is a diagram showing an example of a conceptual configuration of a power supply circuit and FIG. 8 is a diagram showing an example of a conceptual configuration of a heat pump unit.

A power supply circuit illustrated in FIG. 7 further includes a switch section S2 compared to the power supply circuit illustrated in FIG. 6. The switch section S2 selects between a first state where a second conversion section 12 is connected to an input line L1, and a second state where the second conversion section 12 is connected to an input line L3. A controller 22 inputs a control signal to the switch section S2, and the switch section S2 selects between the first state and the second state based on the presence or absence of input of such a control signal.

In such a power supply circuit, the switch section S2 selects the first state, thereby enabling the supply of operating power to the controller 22 through the input lines L1, L2, and the switch section S2 selects the second state, thereby enabling the supply of operating power to the controller 22 through paths other than the input lines L1, L2, namely through the input lines L2, L3.

According to such a power supply circuit, power supply to the controller 22 can be interrupted in the following process. That is, the controller 22 first controls the switch section S2 to select the second state, and the controller 42 causes the switch section S3 to become non-conductive in this state. Consequently, power supply to the controller 22 can be interrupted. On the other hand, power supply to the compressor driving section 21 can be interrupted by the non-conduction of the switch section S1, and hence it is possible to interrupt the power supply to both of the compressor driving section 21 and the controller 22 to implement the stand-by state. Therefore, power consumption can be further reduced.

The switch section S2 desirably selects the second state in a state of not receiving the control signal from the controller 22. That is, in a state where the operating power is not supplied to the controller 22, the switch section S2 desirably selects the second state. This is because the controller 42 causes the switch section S3 to become conductive, so that operating power can be supplied to the controller 22 through the input line L2, L3. Consequently, the controller 22 can be caused to return. Then, the controller 22 causes the switch section S1 to become conductive, so that operating power can be supplied to the compressor driving section 21, and the compressor driving section 21 can be caused to return.

Furthermore, when the controller 22 controls the switch section S2 to select the first state, and the controller 42 causes the switch section S3 to become non-conductive, the input line L3 between the switch sections S2, S3 is caused to be electrically independent. Accordingly, the input line L3 in this section can be used for other purpose. For example, the input line L3 in this section may be used as a communication line between the controllers 22, 42. This is effective for a system where a first device 100 and a second device 200 communicate with each other. As a detailed example thereof, description will be made as follows by taking a heat pump unit as an example.

<Heat Pump Unit>

Figure 8:
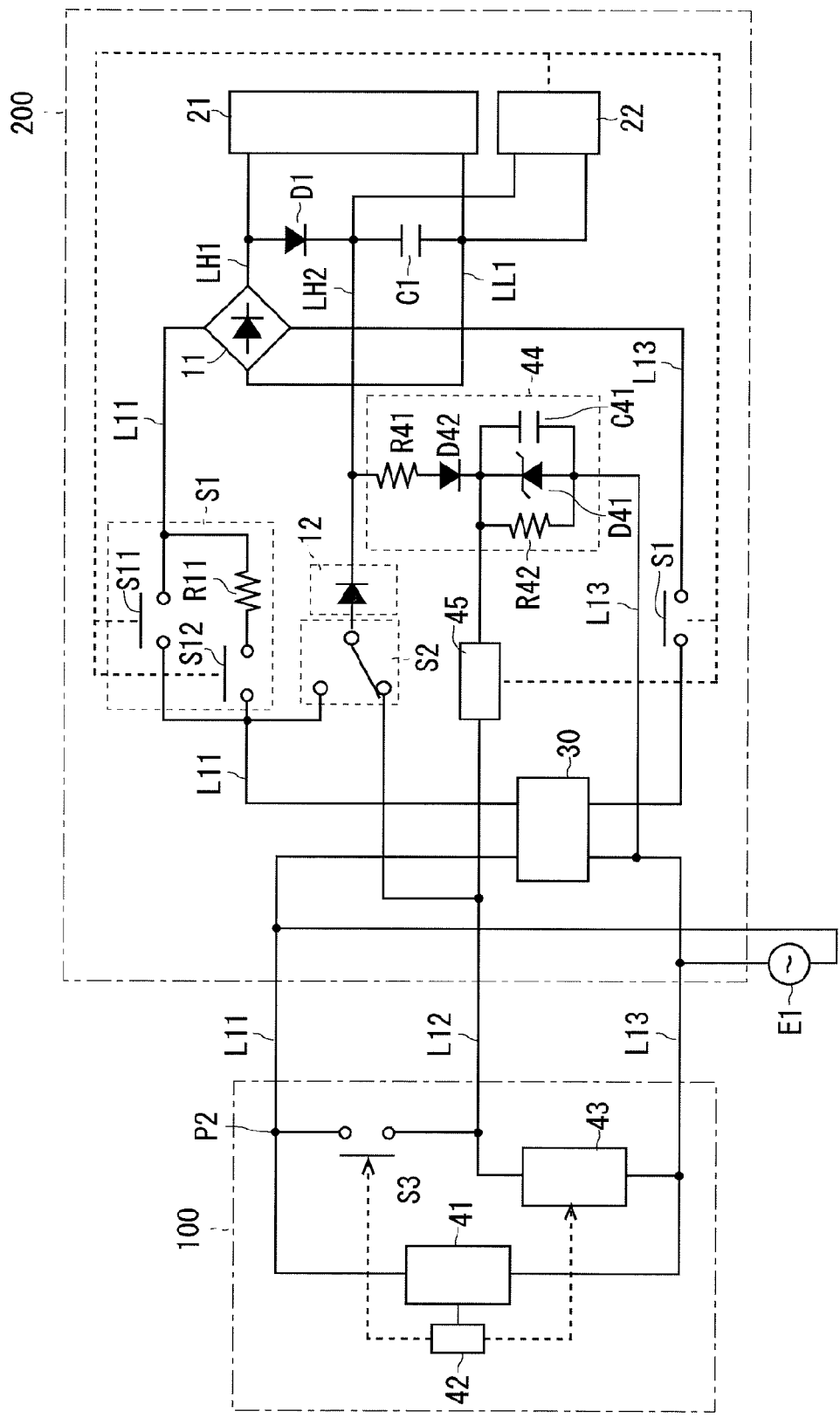

A Heat pump unit is, for example, an air conditioner, or a water heater. As illustrated in FIG. 8, the heat pump unit includes a first device 100 and a second device 200. In a case where the heat pump unit is an air conditioner, the first device 100 corresponds to an indoor unit, and the second device 200 corresponds to an outdoor unit. Hereinafter, description will be made by taking an air conditioner as an example, the first device 100 is referred to as an indoor unit 100, and the second device 200 is referred to as an outdoor unit 200.

The indoor unit 100 is provided in an indoor space that is an object to be temperature-controlled, and the temperature of indoor air is adjusted. The outdoor unit 200 functions as a heat source of the indoor unit 100. In order to implement this, the indoor unit 100 and the outdoor unit 200 include refrigerant circuits (not shown). For example, the indoor unit 100 has a heat exchanger which changes heat between the indoor air and a refrigerant, and the outdoor unit 200 has a heat exchanger which changes heat between outdoor air and the refrigerant. Consequently, heat is exchanged between the outdoor and the indoor. A compressor that compresses the refrigerant, and an expansion valve that throttles and expands the refrigerant, for facilitating the heat exchange in each heat exchanger are generally provided in the outdoor unit 200. In order to facilitate the heat exchange in each heat exchanger, these are provided with fans.

The indoor unit 100 and the outdoor unit 200 communicate with each other, and control the respective control elements (the fans, the compressor, the expansion valve, and the like) to implement air conditioning operation. Hereinafter, electric elements of the indoor unit 100 and the outdoor unit 200 will be described. With reference to FIG. 8, the indoor unit 100 and the outdoor unit 200 are connected to each other by three wires L11, L12, L13.

The indoor unit 100 includes a power supply circuit 41, a controller 42, a communication section 43, and a switch section S3. The power supply circuit 41 is connected to the wires L11, L13. The wires L11, L13 are connected to an alternating-current power supply E1 in the outdoor unit 200, and an alternating-current voltage is input to the power supply circuit 41 through the wires L11, L13. The power supply circuit 41 converts this alternating-current voltage into a suitable direct-current voltage to output the same to the controller 42.

The communication section 43 is connected to the wires L12, L13. The communication section 43 can communicate with the outdoor unit 200 through the wires L12, L13.

The switch section S3 selects conduction/non-conduction between the wires L11, L12. The controller 42 controls the switch section S3.

The outdoor unit 200 includes a first conversion section 11, a second conversion section 12, a compressor driving section 21, a controller 22, a capacitor C1, a diode D1, switch sections S1, S2, a filter 30, a power supply circuit 44, and a communication section 45.

The first conversion section 11 is connected to the wires L11, L13, and an alternating-current voltage is input to the first conversion section 11 from the alternating-current power supply E1 through the wires L11, L13. The wires L11, L13 in the outdoor unit 200 correspond to the above input lines L1, L2. The configurations of a post stage with respect to the first conversion section 11 are similar to the above configurations, and hence the description thereof is not repeated.

The switch section S1 is provided on at least one of the wires L11, L13, and controls conduction/non-conduction between the first conversion section 11 and the alternating-current power supply E1. In the illustration of FIG. 8, the switch sections S1 are provided on the wires L11, L13. In the illustration of FIG. 8, the switch section S1 provided on the wire L11 includes switches S11, S12, and a resistor R11. The switch S12 and the resistor R11 are connected in series with each other, and this series connection body is connected in parallel to the switch S11. The controller 22 controls the switches S11, S12. The controller 22 causes the switch S12 to become conductive, so that an operating voltage can be supplied to the compressor driving section 21 through the resistor R11. Consequently, even when the compressor driving section 21 has a capacitor, it is possible to suppress an inrush current to the capacitor. Thereafter, when the switch S12 is caused to become non-conductive, and the switch S11 is caused to become conductive, an operating voltage can be supplied to the compressor driving section 21 while avoiding voltage drop or power consumption in the resistor R11.

The second conversion section 12 converts the input alternating-current voltage into a direct-current voltage to apply the same to the capacitor C1, namely, to apply the same between power supply lines LH2, LL1 in the illustration of FIG. 8. The switch section S2 selects between a first state where the second conversion section 12 is connected to the wire L11 on the input side thereof, and a second state where the second conversion section 12 is connected to the wire L12 on the input side thereof The switch section S3 is controlled by the controller 22, and selects the second state in a state where a control signal is not input from the controller 22.

When the switch section S2 selects the first state, the alternating-current voltage is input to the second conversion section 12 through the wires L11, L13. When the switch section S2 selects the second state, and the switch section S3 is conductive, the alternating-current voltage is input to the second conversion section 12 through the wires L12, L13.

The power supply circuit 44 generates a direct-current power given to the communication section 45. The power supply circuit 44 is provided, for example, between the power supply line LH2 and the wire L13. More specifically, the power supply circuit 44 includes, for example, resistors R41, R42, a capacitor C41, a zener diode D41, and a diode D42. The resistor R41, the diode D42, and the capacitor C41 are mutually connected in series between the power supply line LH2 and the wire L13. The diode D42 is arranged such that the anode thereof faces toward the power supply line LH2 side. A direct-current voltage rectified by the second conversion section 12 is lowered by the resistor R1 to be charged in the capacitor C41. Consequently, the capacitor C41 smoothes the direct-current voltage rectified by the second conversion section 12. The resistor R41 prevents, for example, an inrush current to the capacitor C41. The capacitor C41, the zener diode D41, and the resistor R42 are mutually connected in parallel. The zener diode D41 keeps the voltage of the capacitor C41 constant. The resistor R42 prevents overvoltage from occurring in the zener diode D41 and the capacitor C41.

The communication section 45 is provided on the wire L12. The wire L12 is provided in the power supply circuit 44, for more detail, between the resistor R41 and the capacitor C41. With such a configuration, a closed circuit which employs the capacitor C41 as a direct-current power supply, and includes the communication section 45, the wire L12, the communication section 43, and the wire L13 is configured, thereby implementing communication of the communication sections 43, 45.

In such an air conditioner, a method of causing the outdoor unit 200 to stand by, and a method of causing the outdoor unit 200 to return from the stand-by will be described.

First, in a case where the indoor unit 100 and the outdoor unit 200 perform air conditioning operation, the switch section S1 is conductive, the switch section S2 selects the first state, and the switch section S3 is non-conductive. Consequently, power is supplied to the compressor driving section 21, the controller 22, and the power supply circuit 44 through the wires L11, L13. The wire L12 is used for the communication of the communication sections 43, 45.

Next, the process for stopping the air conditioning operation and causing the outdoor unit 200 to stand by will be described. The controller 22 causes the switch section S1 to become non-conductive. Consequently, power supply to the compressor driving section 21 is interrupted. Then, a control signal to the switch section S2 is stopped and the switch section S2 is caused to select the second state. At this time, the switch section S3 is non-conductive, and therefore no power supply to the controller 22 is also interrupted. Consequently, power supply to the outdoor unit 200 is interrupted and the outdoor unit 200 can be brought into a stand-by state.

The process for causing the outdoor unit 200 to return will be now described. The controller 42 causes the switch section S3 to become conductive. The switch section S2 selects the second state, and therefore a voltage is applied to the capacitor C1 through the wire L11, the switch section S3, the wire L12, the switch section S2, and the second conversion section 12, and operating power is supplied to the controller 22. Next, the controller 22 outputs a control signal to the switch section S2 and causes the switch section S2 to select the first state. The switch section S1 is caused to become conductive, and power is supplied to the compressor driving section 21. On the other hand, the controller 42 interrupts the switch section S3. Consequently, the outdoor unit 200 can be caused to return from a stand-by state. In order that the controller 42 may know that an operating voltage is supplied to the controller 22, the controller 22 transmits a signal to the controller 42 through the communication sections 45, 43, for example.

As described above, according to this air conditioner, it is possible to use the wire L12 as a communication line, when normal air conditioning operation is performed, and to use the wire L12 as a power supply line that supplies power to the outdoor unit 200 through the wire L12, when the outdoor unit 200 is caused to return from a stand-by state.

While the invention has been shown and described in detail, the foregoing description is in all aspects illustrative and not restrictive. It is therefore understood that numerous modifications and variations can be devised without departing from the scope of the invention.

REFERENCE SIGNS LIST

11: FIRST CONVERSION SECTION
12: SECOND CONVERSION SECTION
21: INDUCTIVE LOAD
22: DIRECT-CURRENT LOAD
C1: CAPACITOR
D1: DIODE
L1 to L3: INPUT LINE
LH1, LL1: POWER SUPPLY LINE
P1: CONNECTION POINT
S1 to S3: SWITCH SECTION

The invention claimed is:

1. A power supply circuit comprising:
   first and second power supply lines that are connected to an inductive load;
   an input line that is connected to an alternating-current power supply;
   a first conversion section that converts, into a first direct-current voltage, an alternating-current voltage input from said input line, and applies said first direct-current voltage between said first and said second power supply lines, said first power supply line being employed as a positive pole;
   a diode that has a cathode and an anode, and is arranged between said first and said second power supply lines such that said anode faces toward said first power supply line side;
   a capacitor that has both ends connected to a direct-current load, and is connected in series with said diode between said first and said second power supply lines;
   a switch section that is provided on said input line, and selects conduction/non-conduction between said alternating-current power supply and said first conversion section; and
   a second conversion section that converts, into a second direct-current voltage, said alternating-current voltage input without passing through said switch section, and is connected to a connection point located between said capacitor and said diode to apply said second direct-current voltage to said capacitor.

2. The power supply circuit according to claim 1, further comprising
   a resistor that is arranged on a side opposite to said capacitor with respect to said connection point, and is connected in series with said diode and said capacitor.

3. The power supply circuit according to claim 1, further comprising
   a resistor that is arranged on a side of said capacitor with respect to said connection point, and is connected in series with said diode and said capacitor.

4. The power supply circuit according to claim 1, wherein said direct-current load is a controller that controls said inductive load, and said second conversion section is a diode half-wave rectifier circuit.

5. The power supply circuit according to claim 4, further comprising:
   a second input line that is connected to the alternating-current power supply; and
   a second switch section that selects between a first state where said second conversion section is connected to said input line, and a second state where said second conversion section is connected to said second input line.

6. The power supply circuit according to claim 4, further comprising:
   a second input line that is connected to the alternating-current power supply; and
   a third switch section that is controlled by a predetermined controller and provided on said second input line.

7. A heat pump unit comprising the power supply circuit according to claim 6, the heat pump unit comprising:
   a first device that has a heat exchanger which changes heat with an object to be temperature-controlled;
   a second device that functions as a heat source of said first device; and wherein one of said first device and said second device includes said third switch section and said predetermined controller, and the other of said first device and said second device includes a second switch section that selects between a first state where said second conversion section is connected to said input line, and a second state where said second conversion section is connected to a second input line.

8. The power supply circuit according to claim 1, further comprising:

a second input line that is connected to the alternating-current power supply; and a second switch section that selects between a first state where said second conversion section is connected to said input line, and a second state where said second conversion section is connected to said second input line.

9. The power supply circuit according to claim 8, further comprising:

a second input line that is connected to the alternating-current power supply; and a third switch section that is controlled by a predetermined controller and provided on said second input line.

10. A heat pump unit comprising the power supply circuit according to claim 9, the heat pump unit comprising:

a first device that has a heat exchanger which changes heat with an object to be temperature-controlled;

a second device that functions as a heat source of said first device; and wherein one of said first device and said second device includes said third switch section and said predetermined controller, and the other of said first device and said second device includes a second switch section that selects between a first state where said second conversion section is connected to said input line, and a second state where said second conversion section is connected to a second input line.

11. The power supply circuit according to claim 1, further comprising:

a second input line that is connected to the alternating-current power supply; and a third switch section that is controlled by a predetermined controller and provided on said second input line.

12. A heat pump unit comprising the power supply circuit according to claim 11, the heat pump unit comprising:

a first device that has a heat exchanger which changes heat with an object to be temperature-controlled;

a second device that functions as a heat source of said first device;

wherein one of said first device and said second device includes said third switch section and said predetermined controller, and the other of said first device and said second device includes a second switch section that selects between a first state where said second conversion section is connected to said input line, and a second state where said second conversion section is connected to a second input line.

* * * * *